US011534030B2

(12) United States Patent
Lee et al.

(10) Patent No.: US 11,534,030 B2
(45) Date of Patent: Dec. 27, 2022

(54) MULTI-GAS PRESSURIZED HOUSING APPARATUS AND METHOD OF MANUFACTURE THEREOF

(71) Applicants: W. Davis Lee, Rockport, ME (US); Warren R. Kirsch, Palo Alto, CA (US); Christian T. Metcalfe, Mercer Island, WA (US)

(72) Inventors: W. Davis Lee, Rockport, ME (US); Warren R. Kirsch, Palo Alto, CA (US); Christian T. Metcalfe, Mercer Island, WA (US)

(*) Notice: Subject to any disclaimer, the term of this patent is extended or adjusted under 35 U.S.C. 154(b) by 0 days.

(21) Appl. No.: 17/002,767

(22) Filed: Aug. 25, 2020

(65) Prior Publication Data

US 2020/0390289 A1 Dec. 17, 2020

Related U.S. Application Data

(63) Continuation-in-part of application No. 16/999,061, filed on Aug. 21, 2020, now Pat. No. 11,432,684, which is a continuation-in-part of application No. 15/125,434, filed as application No. PCT/US2016/050919 on Sep. 9, 2016, now abandoned.

(60) Provisional application No. 62/217,463, filed on Sep. 11, 2015.

(51) Int. Cl.
*A47J 43/12* (2006.01)
*B65B 31/00* (2006.01)
*B65D 83/14* (2006.01)
*B65D 83/42* (2006.01)
*B65D 83/28* (2006.01)
*A23G 3/52* (2006.01)

(52) U.S. Cl.
CPC ............. *A47J 43/12* (2013.01); *B65B 31/003* (2013.01); *B65D 83/14* (2013.01); *B65D 83/28* (2013.01); *B65D 83/42* (2013.01); *B65D 83/752* (2013.01); *A23G 3/52* (2013.01)

(58) Field of Classification Search
CPC ...... A47J 43/12; A23C 13/14; A23C 2270/10; B05B 9/0833; B05B 11/0054; B65D 83/425; B65D 83/68; B65D 83/782; B65D 85/72
USPC ........................................................ 222/325
See application file for complete search history.

(56) References Cited

U.S. PATENT DOCUMENTS

| 2,977,231 A | * | 3/1961 | Palley | ..................... B01F 25/20 |
| | | | | 222/394 |
| 4,526,730 A | * | 7/1985 | Cochran | ........... B01F 23/23611 |
| | | | | 426/477 |

(Continued)

*Primary Examiner* — Vishal Pancholi
(74) *Attorney, Agent, or Firm* — Kevin H. Hazen; Hazen Patent Group, LLC

(57) ABSTRACT

The invention comprises a container apparatus and/or a method of manufacture thereof, comprising: a pressure containment housing containing both a first chemical and a second chemical; an interface configured to control dispersal of the first and second chemical out of the container; and a pressure within the container at time of manufacture exceeding ten bar. Generally, the mixture includes: (1) nitrous oxide as a gas, a liquid, a supercritical fluid, or a solid and (2) at least one of molecular hydrogen, helium, molecular nitrogen, carbon dioxide, neon, argon, krypton, and xenon in the form of a gas, liquid, supercritical fluid, or solid.

16 Claims, 7 Drawing Sheets

(56) References Cited

U.S. PATENT DOCUMENTS

| | | | | |
|---|---|---|---|---|
| 4,935,255 A * | 6/1990 | Anderson | ............... | A23C 3/033 |
| | | | | 426/399 |
| 5,329,975 A * | 7/1994 | Heitel | .................... | B65D 83/42 |
| | | | | 261/DIG. 7 |
| 7,100,799 B2 * | 9/2006 | Gruenewald | ......... | A47J 43/121 |
| | | | | 222/399 |
| 9,227,827 B1 * | 1/2016 | Scott | .................... | B67D 1/0418 |
| 2003/0170356 A1 * | 9/2003 | Yuan | .................... | A23L 3/3445 |
| | | | | 426/313 |
| 2010/0221392 A1 * | 9/2010 | Nakai | ................... | A47J 43/126 |
| | | | | 426/316 |
| 2011/0049193 A1 * | 3/2011 | Muller Kubold | .... | B67D 1/0412 |
| | | | | 222/399 |
| 2013/0340497 A1 * | 12/2013 | Tata | ........................ | C12G 1/06 |
| | | | | 73/1.06 |

\* cited by examiner

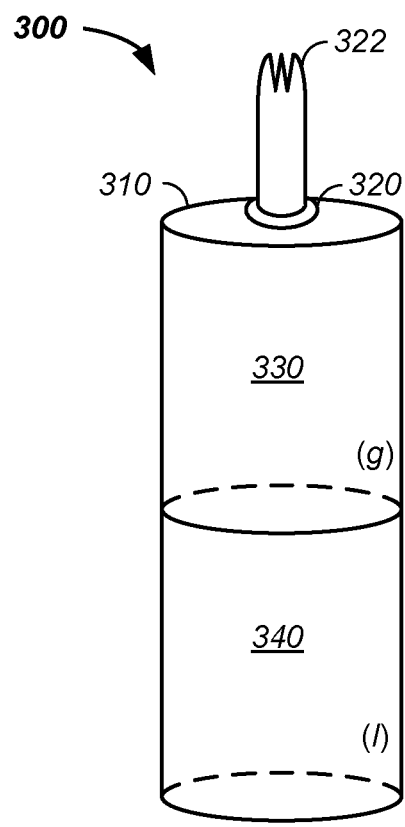
FIG. 3
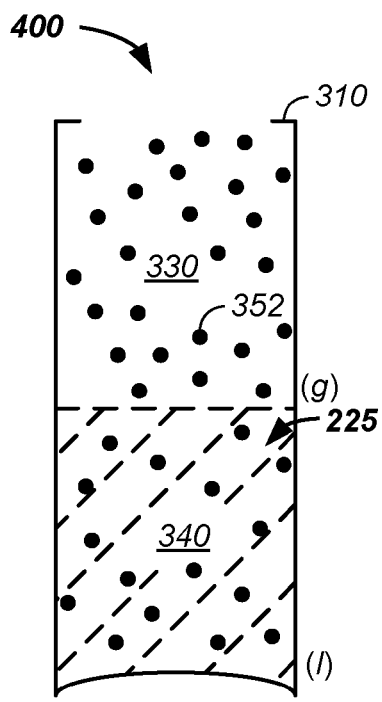 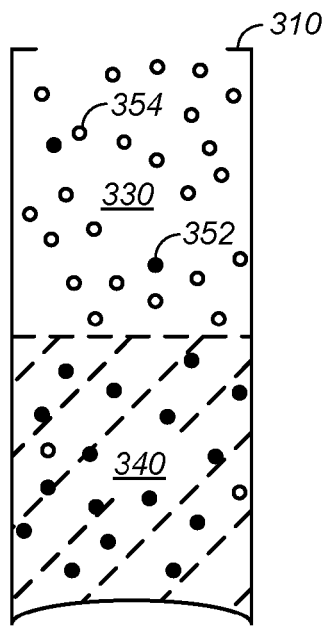 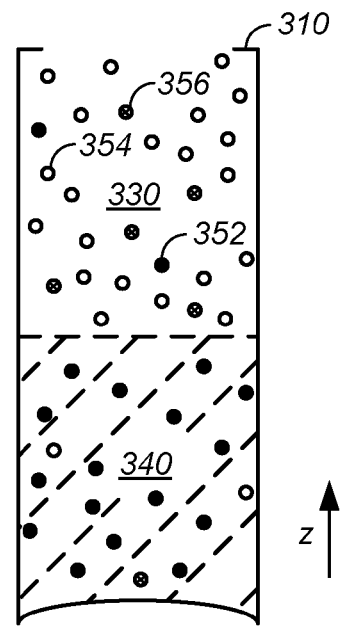
FIG. 4A  FIG. 4B  FIG. 4C

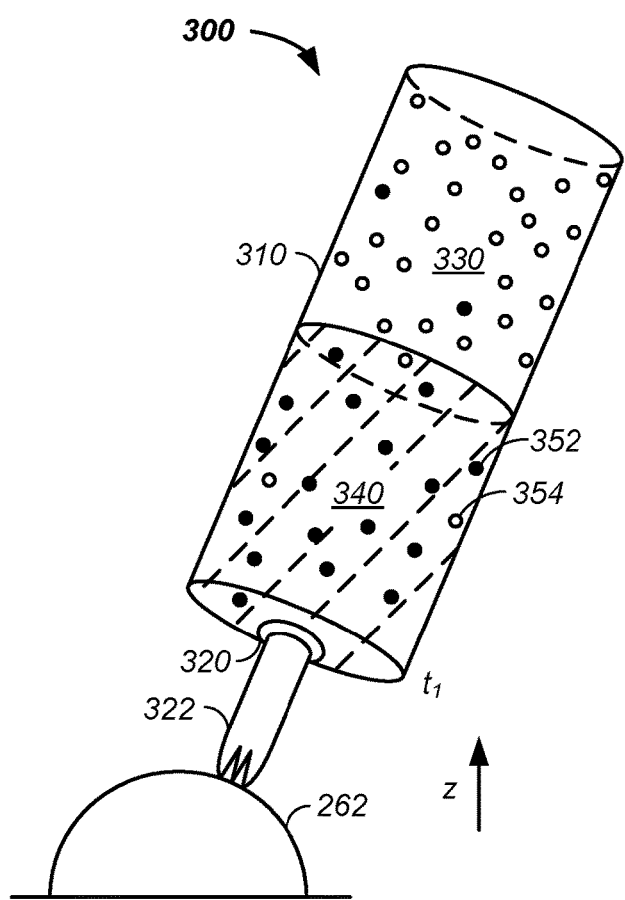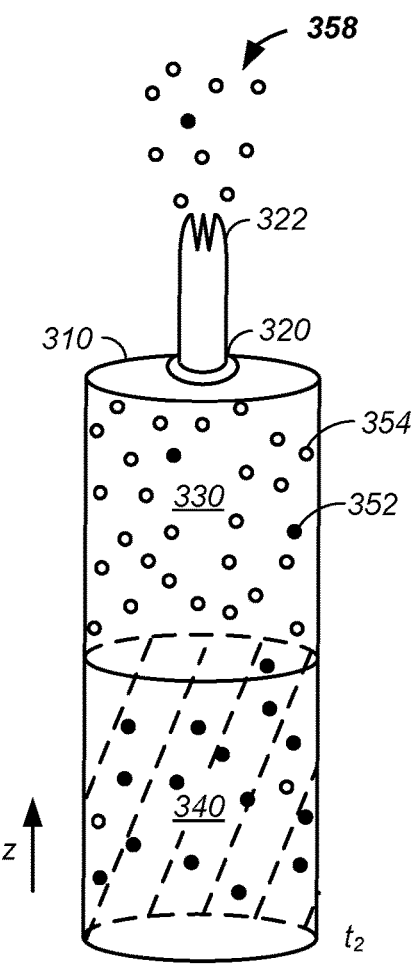
FIG. 5A
FIG. 5B

MULTI-GAS PRESSURIZED HOUSING APPARATUS AND METHOD OF MANUFACTURE THEREOF

CROSS REFERENCES TO RELATED APPLICATIONS

This application is a continuation-in-part of U.S. patent application Ser. No. 16/999,061 filed Aug. 21, 2020, which is a continuation-in-part of U.S. patent application Ser. No. 15/125,434 filed Sep. 12, 2016, which is a national stage application under U.S.C. § 371 and claims priority to international application no. PCT/US2016/050919, filed Sep. 9, 2016, which claims the benefit of U.S. provisional patent application No. 62/217,463 filed Sep. 11, 2015; and
  is related to U.S. provisional patent application No. 61/953,160 filed Mar. 14, 2014 and U.S. provisional patent application No. 62/052,376 filed Sep. 18, 2014,
all of which are incorporated herein in their entirety by this reference thereto.

BACKGROUND OF THE INVENTION

Field of the Invention

The invention relates to a pressurized housing apparatus and method of manufacture thereof.

Discussion of the Prior Art

Nitrous oxide, which is also known as dinitrogen monoxide, $N_2O$, and/or "laughing gas" and colloquially known as nitrous is classified by the United Nations Intergovernmental Panel on Climate Change as a potent greenhouse gas with a global warming potential over three hundred times that of carbon dioxide, $CO_2$. Nitrous oxide is the fourth most common greenhouse gas, behind water vapor, carbon dioxide, and methane.

Nitrous oxide is persistent in the atmosphere, with an average lifetime of one hundred twenty years, and reacts destructively with protective ozone in the stratosphere, which results in a reduction in ultraviolet light absorbance and a greater percentage of harmful incident ultraviolet light from the sun reaching the planet's surface. It follows that a reduction in the emission of nitrous oxide has significant positive long-term benefits to life and materials/structures on earth. Hence, compositions with a smaller percentage of nitrous oxide and/or methods used to reduce nitrous oxide emissions, such as in food preparation, are beneficial.

Nitrous oxide is commonly used to make whipped topping, such as a whipped cream. Whipped cream is used as an element of various food items, such as beverages, crepes, pancakes, and/or desserts. An estimated 500 million eight-gram nitrous oxide gas cartridges are used worldwide annually, resulting in the release of over four million metric tons of nitrous oxide, which has a global warming impact equivalent to 1.2 billion metric tons of carbon dioxide.

In addition, nitrous oxide, is a substance of abuse that is easy to obtain and difficult to detect. Huffing of nitrous oxide to achieve an analgesic, which is often referred to as a narcotic high, has become an abuse problem.

What is needed is a container pressurized with two or more chemicals, method of manufacture thereof, and/or a method of use thereof.

SUMMARY OF THE INVENTION

The invention comprises a pressurized nitrous oxide cartridge apparatus and method of manufacture or use thereof.

BRIEF DESCRIPTION OF THE DRAWINGS

A more complete understanding of the present invention is derived by referring to the detailed description and described embodiments when considered in connection with the following illustrative figures. In the following figures, like reference numbers refer to similar elements and steps throughout the figures.

FIG. 3 illustrates a whipped cream canister;

FIG. 4A, FIG. 4B, and FIG. 4C illustrate a pressure filled container containing one, two, and three gases, respectively;

FIG. 5A and FIG. 5B illustrate a pressurized container in two orientations;

Elements and steps in the figures are illustrated for simplicity and clarity and have not necessarily been rendered according to any particular sequence. For example, steps that are performed concurrently or in a different order are illustrated in the figures to help improve understanding of embodiments of the present invention.

DETAILED DESCRIPTION OF EXEMPLARY EMBODIMENTS

The invention comprises a container apparatus and/or a method of manufacture thereof, comprising: a pressure containment housing containing both a first chemical and a second chemical; an interface configured to control dispersal of the first and second chemical out of the container; and a pressure within the container at time of manufacture exceeding ten bar. Generally, the mixture includes: (1) nitrous oxide as a gas, a liquid, a supercritical fluid, or a solid and (2) at least one of molecular hydrogen, helium, molecular nitrogen, carbon dioxide, neon, argon, krypton, and xenon in the form of a gas, liquid, supercritical fluid, or solid.

This disclosure additionally provides compositions of nitrous oxide mixtures, and methods for using the same, including in food preparation to generate aerated food products and/or aerated compositions.

Generally, the generated compositions reduce the amount of nitrous oxide required versus traditional methods using pure nitrous oxide. For example, the compositions reduce the amount of nitrous oxide used to prepare an equivalent amount of aerated food product, while retaining aeration and at least one of and preferably all of volume, flavor, and an aroma profile. The mixtures and methods reduce the amount of nitrous oxide emissions generated in the preparation of various products.

Herein, a z-axis is aligned with gravity, where an x-axis and a y-axis form a plane perpendicular to the z-axis.

Figure 1A:
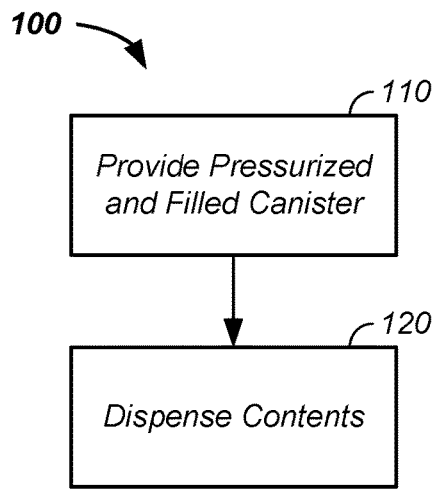
FIG. 1A and FIG. 1B illustrate a method of use of a pressurized container and whipped cream dispenser, respectively.

Referring now to FIG. 1A, a method of dispensing a product 100 from a pressurized container is illustrated.

Generally, the method of dispensing a product 100 comprises the steps of providing a pressurized and product constituent filled container 110 and a step of dispensing contents 120 from the pressurized container.

Herein, without loss of generality and for clarity of presentation, food products and whipped cream are used as non-limiting examples of products dispensed by the taught apparatus and methods of use thereof. Again, for clarity of presentation and without loss of generality, examples are used for preparation, storage, and/or dispersion of the nitrous oxide mixtures, with particular examples to whipped cream. However, more generally, the invention relates to preparation, storage, and/or dispersion of any composition containing nitrous oxide and/or a second gas, such as a noble gas, from a pressurized container.

Figure 1B:
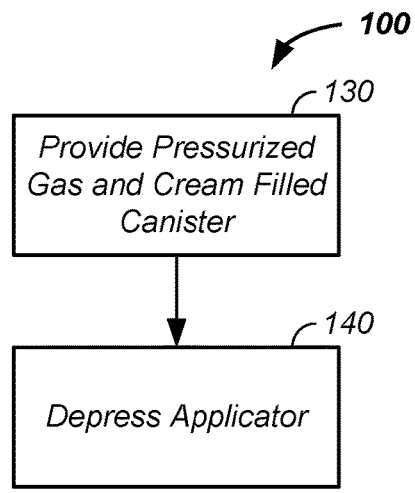

Referring now to FIG. 1B, the method of dispensing a product 100 is illustrated where steps include: providing a pressurized gas and cream filled canister 130 and depressing an applicator mechanism, such as a trigger or button, to dispense the product 140.

Figure 2:
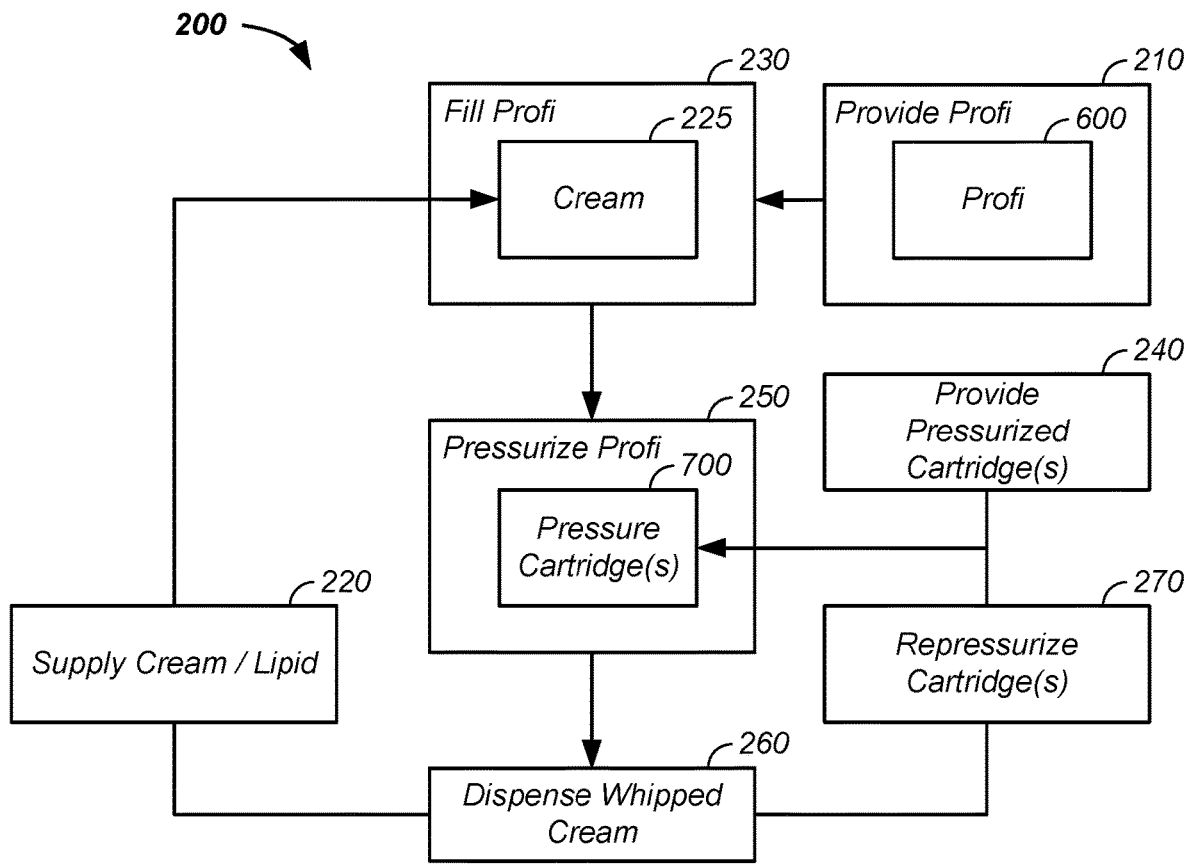
FIG. 2 illustrates assembly and use of a profi or reusable pressure vessel.

Referring now to FIG. 1B, FIG. 2, and FIG. 3, a whipped cream canister 300 is distinguished from a profi 600. For example, the U.S. Department of Transportation (DOT) carefully regulates the pressure of shipped canisters, such as a whipped cream canister 300, such as purchased at a grocery store to contain a maximum pressure of 200 pounds per square inch (psi). Indeed, whipped cream canisters sold in grocery stores are governed by special permits limiting the canisters to 150 psi prior to leaving a production facility. Further, whipped cream is dispensed from the whipped cream canister 300 until one or more of the cream and the nitrous oxide in the whipped cream canister 300 is depleted. The whipped cream canister 300 is not refillable. In stark contrast, the profi 600 comprises a container containing, at initial dispensation of a product, a pressure in excess of 200 psi, such as above 200, 300, 500, 700, 740, 750, 760, 775, 1000, or 2000 psi. The profi 600 is optionally and preferably refillable, such as with cream 225 and the use of a removeable/replaceable pressurized cartridge 700. Optionally and preferably, the profi 600 is refilled and/or repressurized by an individual outside of a manufacturing facility, such as at a coffee shop, restaurant, or a personal residence.

Referring again to FIG. 2, a method of use of a profi 200 is illustrated. The method of use of a profi 600 includes one or more of the steps of: providing a profi 210, supplying a cream/lipid 220, filling the profi 230, such as with the cream 225, pressurizing the profi 250, and dispensing the whipped cream 260, or other product. Optionally and preferably, the method of use of the profi 200 includes one or more of the steps of: providing a pressurized cartridge 240 and/or repressurizing an already used cartridge 270 and using the pressure cartridge 700 in the step of pressurizing the profi 250. Stated again, a profi 600 is optionally charged with a new or refilled pressure cartridge 700. The pressure cartridge 700 is further described, infra.

A whipped cream canister 300 contains a maximum pressure of 200 psi and is a single use item, until one or more of the nitrous oxide and/or cream is dispensed. In stark contrast, a profi 600 uses a pressure cartridge 700 to charge the profi 600 with a gas containing nitrous oxide, where the pressure cartridge 700 and/or the profi is reusable. The pressure cartridge 700 includes an outer pressure wall 710 that contains an internal, typically pressurized, volume. The pressure cartridge optionally and preferably contains a pressure gas delivery port that connects to receiving/charging port of the profi 700. The pressure gas delivery port is optionally opened when charging the profi in either a temporary, permanent, or resealable manner, such as with a valve and/or a pressure regulator.

Referring now to FIG. 3, the whipped cream canister 300 is further described. The whipped cream canister includes a low pressure containment housing 310 and an interface 320 to an applicator tip 322. The low pressure containment housing 310 contains a gas volume, such as nitrous oxide 352, at a maximum pressure of 200 psi and a liquid volume 340, which included the cream 225. To dispense whipped cream 262 from the whipped cream canister 300, the interface 320 is temporarily opened, which allows the internal nitrous oxide 352 to dispense along with the cream 225. The sudden change in pressure from an internal pressure within the low pressure containment housing to a still lower atmospheric pressure causes dispensed nitrous oxide to expand, which expands the cream 225 into a form of whipped cream 262.

Referring now to FIGS. 4(A-C), constituents 400 of the low pressure whipped cream canister 300 and/or the profi 600 are described. For clarity of presentation and without loss of generality, as illustrated, the constituents 400 are contained in the low pressure containment housing 310. However, the constituents are optionally contained, in a high pressure containment housing 610 of the profi 600. In reference to the description of FIGS. 4(A-C), the term housing is used to refer to both the low pressure containment housing 310 of the whipped cream canister 300 and the high pressure containment housing 610 of the profi 600. Herein, the clause canister/cartridge refers to the whipped cream canister 300, the high pressure containment housing 610, and/or the pressure cartridge 700 used to charge the profi 600.

Pressurized Housing Gases

Referring now to FIG. 4A, a first case of a single gas, such as nitrous oxide 352, and cream 225 in the housing is illustrated. In this first case, the constituents 400 in the housing include: a gas volume 330 and a liquid volume 340. The gas volume 300 contains nitrous oxide 352. The liquid volume 340 contains the cream 225 and nitrous oxide 352 dissolved in the cream 225. In this first case, nitrous oxide is at least 95, 96, 97, 98, 99, 99.5, and/or 99.9 percent of the gas in the housing. The balance of the gas is outgassing from the cream and/or impurities, in the nitrous oxide and/or ambient air, making their way into the housing in a manufacturing step.

Referring now to FIG. 4B, a second case of two gases, such as nitrous oxide 352 as a first gas and a second gas, along with cream in the housing is illustrated. In this second case, the constituents 400 in the housing still include: a gas volume 330 and optionally a liquid volume 340. The gas volume 330 includes a first gas, such as nitrous oxide, and a second gas intentionally introduced into the housing, not an accidental inclusion of atmospheric gas, during a pressurization of the housing step. For example, the first gas and the second gas are intentionally used to charge the whipped cream canister 300 at a manufacturer or the first gas and the second gas are intentionally introduced in the profi pressurization step 250, described supra. The first gas is optionally and preferably nitrous oxide 352. The second gas is ambient air, such as air in the earth's atmosphere, hydrogen, helium, nitrogen, carbon dioxide, neon, argon, krypton, or xenon. A preferred second gas is argon. Relative partial pressures, volumes, mol content, and/or concentrations of the first gas and second gas are further described, infra. In this second case, environmental air is not intentionally introduced into the housing, but may make up an impurity of up to 3, 2, 1, 0.5, 0.25, 0.1, or 0.01 percent by volume and/or by mass.

Figure 6A:
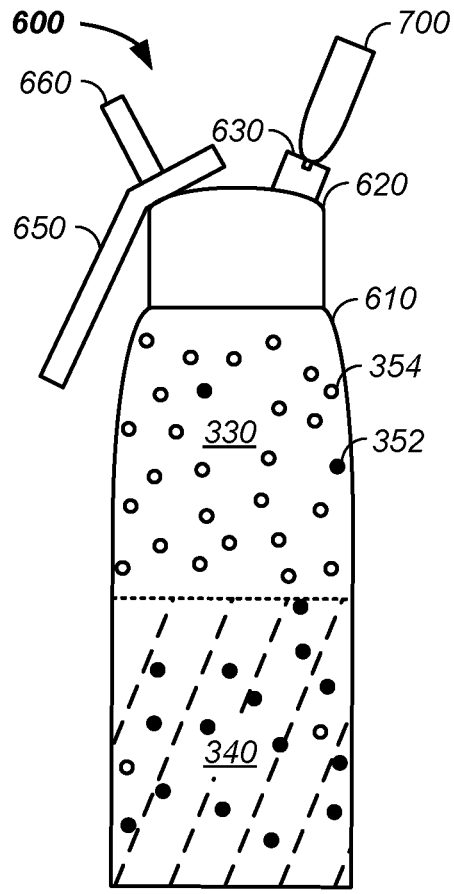
FIG. 6A and FIG. 6B illustrate profis.

Still referring to FIG. 4B, the two gases introduced into the housing are further described in terms of the presence of the cream 225. For clarity of presentation and without loss of generality, the first gas in this example is nitrous oxide 352 and the second gas is a noble gas, such as argon 354. Nitrous oxide 352 is soluble in fats and/or lipids, such as are present in the cream 225. Argon 354 is relatively insoluble in the cream 225. Thus, as illustrated, the concentration of nitrous oxide 352 falls in the gas volume 330 above the cream 225 while the argon 354 remains in high concentration in the gas volume 330/headspace of the container. As a result, inhalant abuse or huffing of the nitrous oxide through dispensing the gases from the housing in an upright position, a proper inverted position is used to dispense whipped cream, is ineffective for a high as the nitrous oxide concentration in the headspace is diminished as the nitrous oxide resides in the cream 225. Discussion of the percentage of nitrous oxide in the headspace and cream are provided, infra. In this second example, the pressurized argon 354 functions to eject the cream 225 and dissolved nitrous oxide when the housing is used in a proper inverted orientation, where the liquid volume 340 covers an entrance to a delivery port, such as a dispensing port. In FIG. 6A, further described infra, the dispensing port 660 is further described.

In FIG. 3, the dispensing port of the whipped cream canister 300 is the an exit through which the cream 225 passes during use to atmosphere, such as through the interface 320 and the applicator tip 322.

Referring now to FIG. 4C, three gases are optionally introduced into the housing, canister, and/or cartridge. For clarity of presentation and without loss of generality, in this example the first gas is nitrous oxide 352, the second gas is argon 354, and the third gas is nitrogen 356, though any gases are optionally used. As illustrated, the nitrous oxide permeates/dissolves into the cream 225/liquid volume 340/liquid phase while the argon 354 and the nitrogen 356 remain primarily in the headspace/gas volume 330. Further, the analgesic effect of nitrous oxide follows a logarithmic scale, thus reducing nitrous oxide in the headspace above the cream is significantly amplified when it comes to reduction in the analgesic effect for the huffer. As a result, if huffed, the huffer is huffing the non-high inducing gases of argon 354 and nitrogen 356, while if the canister/cartridge is properly inverted, the whipped cream is dispensed as the product is intended. Generally, any number n of gases are introduced into the canister/cartridge/profi, where n is a positive integer, such as 2, 3, 4, 5, 6, 7, or more. Optionally and preferably, the concentration of each gas is greater than 0.001, 0.01, 0.1, 1, 2, or 3 percent. Generally, a preferred concentration of each gas exceeds the concentration of that gas in the earth's atmosphere as adjusted for pressure. Stated again, generally the second, third, fourth, . . . , $n^{th}$ gas is present at a concentration above atmospheric air compressed to the pressure in the canister, cartridge, and/or low pressure containment housing 310 of the whipped cream canister 130, the high pressure containment housing 610, and/or the profi 600. Hence, the concentration of each gas in the canister/cartridge exceeds a concentration obtained through the accidental inclusion of atmospheric air in the manufacturing/pressurization/charging process, such as in the step of providing a pressurized gas and cream filled canister 130 and/or the step of pressurizing the profi 250.

Optionally, the filled canister 130 is a sealed can/soda can/beverage can, such as dispensed from a vending machine, which is opened by the user just prior to drinking a contained beverage. For instance, the act of opening the sealed can uses a pop top or a lid that is removed by unscrewing a cap. Generally, the sealed can is packaged using any of the 1, 2, 3, or more gases, described supra, in combination with the beverage, where the 1, 2, 3, or more gases are optionally and preferably dissolved into the beverage at time of production and form a headspace, such as in equilibrium with the beverage prior to the user opening the sealed can.

Atmospheric and Compressed Atmosphere Concentration of Gases

This section details maximum atmospheric gas concentrations intentionally and/or accidentally introduced as an impurity into the canister/cartridge.

The Earth's atmosphere is at one atmosphere (atm) pressure. Atmosphere is optionally placed in the low pressure containment housing 310 of the whipped cream canister 130 or the high pressure containment housing 610 of the profi 600 as an impurity and/or is intentionally used as one of the one or more pressurizing gases. In any case, the maximum amount of any environmental air constituent is a multiple of the environmental air concentration, where the multiple is the maximum pressure in atmospheres in the housing at time of filling. A relationship of housing pressure to atmospheres is provided in Table 1.

TABLE 1

| Canister and Cartridge Pressures | | | |
|---|---|---|---|
| Housing Type | Condition | psi | atm |
| Canister | Initial Filling Pressure | 175 | 11.9 |
| Canister | Maximum Pressure* | 200 | 13.6 |
| Cartridge | N$_2$O phase change minus 25 psi | 725 | 49 |
| Cartridge | N$_2$O phase change | 750 | 51 |
| Cartridge | N$_2$O phase change plus 25 psi | 775 | 53 |
| Cartridge | Optional Filling Pressure | 1,000 | 68 |
| Cartridge | Optional Filling Pressure | 2,000 | 136 |

*as allowed by the U.S. Department of Transportation

It follows, that the maximum concentration of a component of the atmosphere in the whipped cream canister 130 or high pressure containment housing 610 is the atmospheric concentration times the initial atmospheric pressure of the whipped cream canister 130 or high pressure containment housing 610.

The Earth's atmosphere contains many components. The concentration of selected gases in the Earth's atmosphere is provided in Table 2 along with the maximum pressure of the component at 200 psi or 13.6 atm, the highest pressure of the whipped cream canister 300 allowed to be shipped by the U.S. Department of Transportation. For instance, the highest possible pressure of xenon in the whipped cream canister 130 by compressing atmospheric air into the canister is 1.18 ppm (0.087 ppm*13.6) at 200 psi or 13.6 atm, the highest pressure allowed by the U.S. Department of Transportation. Thus, a concentration of greater than 1.18 ppm xenon in the whipped cream canister 13.6 means that the manufacturer had to purposely add xenon to the canister, where the added gas containing xenon has a xenon concentration higher than naturally occurring xenon concentration in air/atmosphere. Like calculations reveal if the compressed gas used to fill the whipped cream canister 130 or profi 600 exceeds concentrations found in earth's atmosphere.

TABLE 2

Atmospheric and Compressed Atmospheric Gas Concentrations.

| Gas | Atmospheric Concentration (Percent) | Atmospheric Concentration (ppm) | Concentration at 13.6 atm (ppm) |
|---|---|---|---|
| Nitrogen | 78.084 | 780,790 | 10,618,744 |
| Oxygen | 20.946 | 209,445 | 2,848,452 |
| Argon | 0.934 | 9,339 | 127,010.4 |
| Carbon Dioxide | 0.041 | 404 | 5,490 |
| Neon | 0.0018 | 18.21 | 247 |
| Helium | 0.00052 | 5.24 | 71.3 |
| Krypton | 0.0001 | 1.14 | 15.5 |
| Hydrogen | 0.00005 | 0.5 | 6.8 |
| Methane | 0.000187 | 0.5 | 6.8 |
| Xenon | 0.0000087 | 0.087 | 1.18 |

Several examples are provided as to the contents of the cartridge/canister and/or the profi 600.

Example I

Referring still to FIG. 4C and Table 2, in a first example: for two, three, four, or more gases introduced into the cartridge/canister whipped cream canister 130, and/or the profi 600, an optional and preferred concentration of each gas is greater that the concentration of each respective gas in the atmosphere at 200 psi or 13.6 atm of pressure, as listed in column 4 of Table 2.

Example II

Referring again to FIG. 4B, in a second example, for two gases introduced into the cartridge/canister whipped cream canister 130, and/or the profi 600, optionally and preferably, the first gas is nitrous oxide and the second gas is air or the first gas is nitrous oxide and the second gas is selected from column 1 of Table 2.

Example III

Referring again to FIG. 4C, in a third example, three, four, or more gases are introduced into the cartridge/canister whipped cream canister 130, and/or the profi 600, where optionally and preferably the first gas is nitrous oxide, the second gas is selected from column 1 of Table 2, and the third gas is selected from column 1 of Table 2.

Example IV

Referring again to FIG. 4C, in a fourth example, for three, four, or more gases introduced into the cartridge/canister whipped cream canister 130, and/or the profi 600, optionally and preferably the first gas is nitrous oxide, the second gas is selected from column 1 of Table 2, and the third gas is air.

Example V

Referring again to FIG. 4C, in a fifth example, for four or more gases introduced into the cartridge/canister whipped cream canister 130, and/or the profi 600, optionally and preferably, the first gas is nitrous oxide, the second gas is selected from column 1 of Table 2, the third gas is selected from column 1 of Table 2, and the fourth gas is air.

Proper/Improper Use of Canister/Cartridge

Referring now to FIG. 5A and FIG. 5B, the whipped cream canister 300 is illustrated in a proper whipped cream dispensing orientation and an improper huffing orientation, respectively. In both the dispensing orientation and the huffing orientation, the liquid volume 340 is pulled by gravity, z-axis, downward and the lower density gas volume 330 rises above the lower liquid volume. Thus, referring now to FIG. 5A, when the whipped cream canister 300 is orientated in the dispensing orientation and the can is activated, opened to atmosphere via the applicator tip 322, whipped cream 262 is dispensed via the dispensing port immersed in the liquid volume 340. Further, referring now to FIG. 5B, when the whipped cream canister 300 is orientated in a huffing orientation, where the dispensing port is immersed in the air volume 330, the less dense gas volume 330 is dispensed. As illustrated, in the huffing orientation, the nitrous oxide is dissolved into the cream in the liquid volume 340 and the gas volume 330 is dominated by the non-soluble gas, argon 354. More generally, the gas volume 340 contains any one, two, three, or more of nitrogen, oxygen, argon, carbon dioxide, neon, helium, krypton, hydrogen, methane, xenon, atmosphere, and a noble gas, while the high inducing nitrous oxide remains dominantly dissolved in the cream 225 and/or is in the liquid volume, such as more than 50, 60, 70, 80, 90, or 95 percent of the nitrous oxide, by mass. FIG. 5A and FIG. 5B illustrate the gas volume 330 rising above the liquid volume 340; the same logic of dispensing whipped cream in the inverted dispensing orientation and dispensing non-high inducing gases in the upright huffing orientation is applied to the high pressure containment housing 610 or the profi 600.

Profi

Figure 6B:
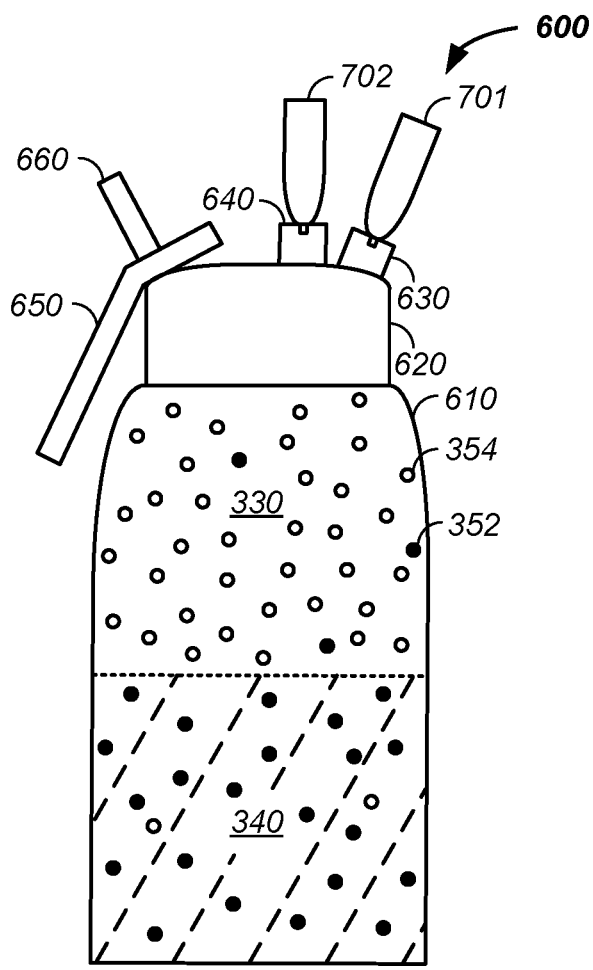
Figure 7:
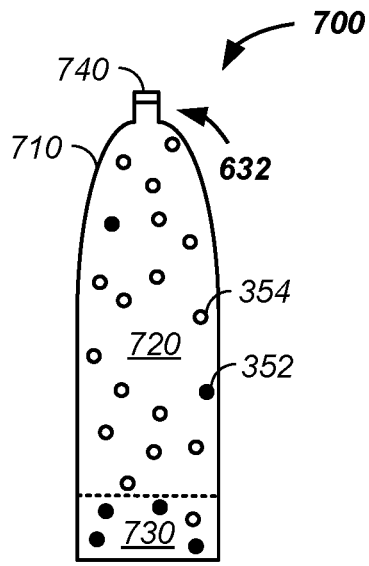
FIG. 7 illustrates a pressurized cartridge.

Referring now to FIG. 6A, FIG. 6B, and FIG. 7, the profi 600 is further described. Generally, as described, supra, the profi 600 includes a high pressure containment housing 610 that is pressurized using a replaceably attached pressure cartridge 700, such as attached by an end user. During use, cream 225 in the liquid volume 340 of the high pressure containment housing 610 is dispensed when the profi 600 is held in an inverted dispensing orientation and the high pressure containment housing 610 is temporarily opened to a lower pressure, such as atmospheric pressure, such as via the dispensing port.

Referring now to FIG. 6A, the pressure containment elements of the profi 600 are further described. Generally, the high pressure containment housing 610 of the profi 600 contains the liquid volume 340, such as the cream 225 and dissolved nitrous oxide as described above, and the gas volume 330, such as the less soluble gases of argon, nitrogen, and the like as described above. Before pressurization, the liquid contents of the profi are added, such as the cream 225 and any optional additive as further described, infra. As illustrated, the high pressure containment housing 610 is attached to a lid 620, such as a removable lid attached as a thread on lid. Optionally, the lid is hingedly attached to the high pressure containment housing. Generally, the high pressure containment housing 610 contains any sealable/resealable opening for adding the contents, such as the cream 225.

Still referring to FIG. 6A and referring again to FIG. 7, the pressurization elements of the profi 600 are further described. Generally, the pressure cartridge 700 is attached to the profi 600 and the higher pressure in the pressure cartridge 700 is equalized with the lower pressure in the now sealed profi 600, lid 620 sealed to high pressure containment housing 610. As illustrated, the pressure cartridge 700 is attached to a receiving port 630, which opens the contents of the pressure cartridge 700 to an interior volume of the profi 600. The sealing port 620 is optionally attached with a lock and key interface, such as a physical key shape of an end of the pressure cartridge 600 inserts into a lock element of the receiving port 630 or vise-versa. Similarly, an end or element of the pressure cartridge 600 screws into the receiving port 630 of the profi 600. Similarly, a slip connection and/or a regulator are optionally used as part of the receiving port. Generally, any attachment, physical interface, and/or accessory used to deliver gas(es) from the pressure cartridge 700 to the profi 600 is used as the receiving port 630. As illustrated, a valve 740 couples the receiving port 620 to the pressure cartridge 700. The valve 740 is optionally and preferably a pneumatic style valve, such as a Schrader valve. The valve 740 is optionally a one-way valve, which prevents flow of the cream 225 from the profi 600 into the pressure cartridge 700, which eases the process of repressurizing the cartridge 270 for reuse. The valve 740 is optionally affixed to the receiving port 620 and the pressure cartridge 700 is brought into contact with the valve 740 in the process of pressurizing the profi 250. Optionally and preferably, the pressure cartridge 700 is detached from the profi 600 in a step prior to the step of dispensing the whipped cream 260.

Still referring to FIG. 6A, the pressure cartridge 700 is optionally connected to a side or a bottom of the profi 600, which allows a gas or multiple gases from the headspace above a liquid in the pressure cartridge 700 to pass into the profi 600 without the liquid from the pressure cartridge 700 passing into the profi 600. For instance, nitrous oxide gas above a nitrous oxide liquid in the pressure cartridge 700 is passed into the profile, such as through a pressure charging port/valve.

Still referring to FIG. 6A, the dispensing elements of the profi 600 are further described. Generally, the profi includes a product dispensing port 660 and a trigger 650 for alternatingly opening and closing the dispensing port 660. As illustrated, the trigger 650 is a squeezable handle that when pulled on by the fingers of a hand grasping a handheld version of the profi 600 opens a dispensing valve in the dispensing port and by relaxing pressure on the handle, the dispensing valve is shut. When the dispensing valve is opened, the cream 225 and at least the nitrous oxide 352 are dispensed, where the nitrous oxide 352 introduced into the lower pressure of normal atmospheric pressure expands to form the whipped cream 262. Generally, the dispensing elements of the profi 600 include any trigger, button, and/or mechanical mechanism opening a path through the dispensing port 660 to allow passage of one or more contents in the profi 600 to a volume outside of the profi 600.

Optionally, the receiving port 620 is integrated into the dispensing port 660 where the pressure cartridge 700 is used to pressurize/charge the profi 600, the pressure cartridge is removed after a first seal is closed and the first seal and/or a second seal is mechanically/electromechanically opened, such as triggered by a button or lever, resultant in at least one content of the profi 600 being released through the first and/or second seal to an environment outside of the profi 600.

Referring again to FIG. 6B, the profi 600 is illustrated with a first receiving port 630 and a second receiving port 640, where the first and second receiving ports 630, 640 respectively attach to a first and second pressure cartridge 701, 702. Referring still to FIG. 6B and referring again to FIG. 6A, optionally and preferably the first pressure cartridge 701 is used to pressurize the profi 600 through the first receiving port 630 and, after detaching the first pressure cartridge 701 from the first receiving port 630, the second pressure cartridge 702 is used to further pressurize the profi through the first receiving port 630. Generally, the profi 600 contains any number m and n of receiving ports 630 and dispensing ports 660, respectively, where m and n are positive integers of 1, 2, 3, or more. Optionally and preferably the receiving port 630 is specified for pressures of 200, 300, 750, 1000, 2000, 3000, or more psi and the dispensing port operates at pressures up to 150, 175, or 200 psi. Optionally, any number of pressure cartridges 700 are sequentially used to pressurize the profi 600, such as for a single batch of cream 225, as further described infra.

Mixed Pressure Cartridges

Still referring to FIG. 6A, FIG. 6B, and FIG. 7, pressurizing the profi 600 with 1, 2, 3, or more mixed gas pressure cartridges and/or 1, 2, 3, or more single gas profi cartridges is described. Generally, if it is desired to pressurize the profi 600 with two or more gases, then the two or more gases are optionally provided in a single pressure cartridge or a first gas is introduced into the profi 600 via a first pressure cartridge 701 and a second gas is introduced into the profi 600 via a second pressure cartridge 702, either sequentially, such as via a single receiving port or in parallel via two receiving ports. Examples are used to describe the process of pressurizing the profi 250.

Example I

In a first example, it is desired to charge the profi 600 with two gases, such as nitrous oxide and nitrogen at a desired ratio. In a first case, the profi 600 is charged with a pressure cartridge 700 containing the desired ratio, as measured by partial pressures, moles, and/or mass, of nitrous oxide and nitrogen. In a second case, the profi 600 is pressurized through sequential attachment of a first pressure canister 701, such as filled with one of nitrous oxide or nitrogen, and attachment of a second pressure canister 702, such as the remaining element of nitrous oxide and nitrogen not in the first pressure container 701. In the second case, the desired ratio of the nitrous oxide and nitrogen is obtained by partial pressures, moles, and/or mass and/or through use of a first pressure in the first pressure container 701 and a second pressure in the second container differing from the first pressure by at least 0, 1, 2, 3, 4, 5, 10, or 15 percent. In a third case, the profi 600 is charged in parallel with a first pressure container 701 containing a first gas, such as nitrous oxide, connected to the first receiving port 630 and a second pressure container 701 containing the second gas, such as nitrogen, connected to the second receiving port. In the second and third cases, standard chemistry/physics equations relating pressure and concentration to volume are used to obtain the desired ratio/concentration/content of nitrous oxide and nitrogen, as measured by mass, percent volume, moles, and/or partial pressure. Naturally, any two gases are substituted for nitrous oxide and nitrogen in this example. Further, extension of this example allows pressurization of the profi 600 with 3, 4, 5 or more gases and/or air through 1 or more pressurization ports. In the described manner, the amount of each of a first gas, a second gas, a third gas, . . . , and/or an $n^{th}$ gas at time of pressurization is adjustable from 0 to 100 percent of the introduced gas, such as greater than 0, 1, 2, 3, 4, 5, 10, 15, 20, 25, 30, 35, 40, 45, 50, 60, 70, 80, or 90 percent of a given gas and less than 100, 99, 98, 97, 96, 95, 90, 80, 70, 60, 50, 40, 30, 20, or 10 percent of the given gas, such as any gas listed in Table 2.

Pressure Cartridge with Liquid Phase

Figure 8:
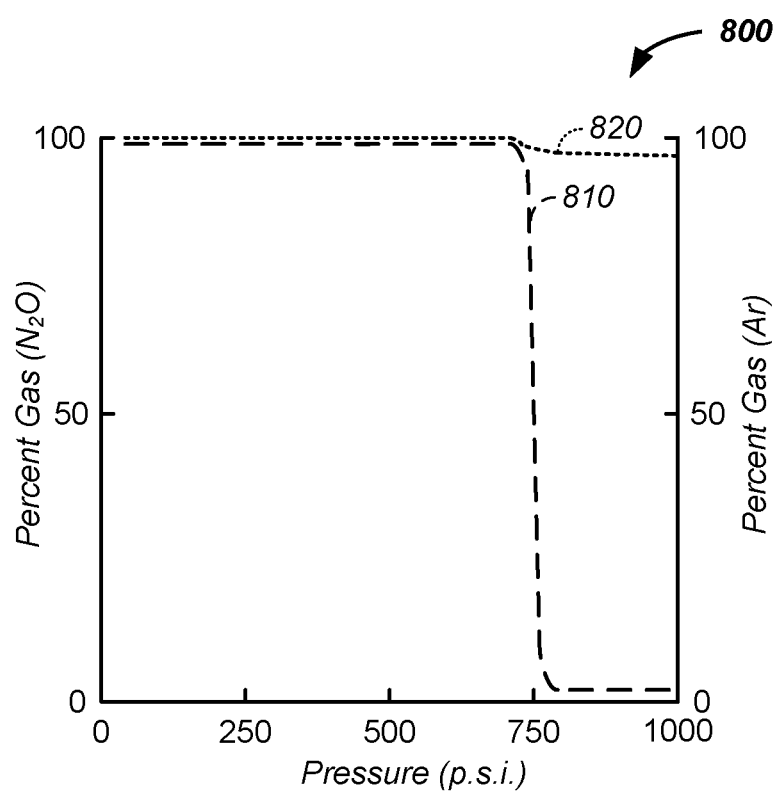
FIG. 8 illustrates a phase change of nitrous oxide.
Figure 9:
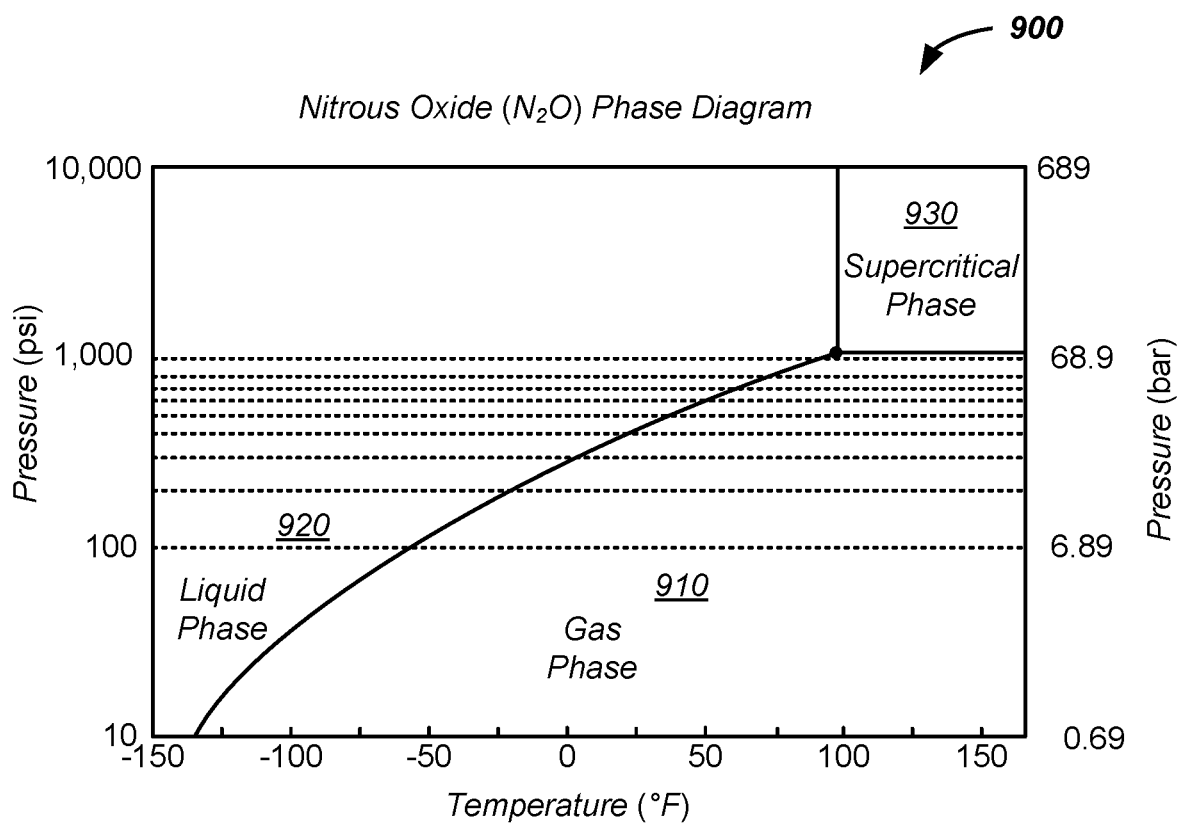
FIG. 9 illustrates a nitrous oxide phase diagram.

Referring again to FIG. 7 and referring now to FIG. 8 and FIG. 9, a pressure cartridge 700 containing a liquid form of one or more gases is described. For clarity of presentation and without loss of generality, nitrous oxide is used in examples of a pressure cartridge containing at least a liquid form of an atom or molecule that is a gas at standard temperature, 25° C., and pressure, 1 atm, though any one or more gases are optionally present in the pressure cartridge 700 in the form of a gas and/or a liquid. Referring now to FIG. 8, at pressures exceeding 750 psi, nitrous oxide is present as a liquid, while argon is still in a gas form from at least 750 to 1000 psi.

Referring still to FIG. 7, nitrous oxide 352 and argon 354 are in the pressurized cartridge 700. Further, as illustrated, the pressure in the pressurized cartridge has forced the nitrous oxide 352 to be at least in a liquid phase, such as in a liquid fraction 730 inside the pressurized container, and to optionally be in a gas phase, in a headspace gas fraction 720 inside the pressurized cartridge 700.

Referring now to FIG. 9, a nitrous oxide phase diagram 900 is presented. Notably, nitrous oxide transitions from a nitrous oxide gas phase 910 to a nitrous oxide liquid phase 920 at a pressure exceeding 750 psi at room temperature and is in a nitrous oxide supercritical phase 930 above 1000 psi, FIG. 9.

The pressure cartridge 700 is optionally maintained at a temperature and pressure where the nitrous oxide is in the form of a solid, liquid, or a supercritical fluid. When two or more gases are present in the pressure cartridge, the temperature and pressure are optionally set where each of the two or more gases are in a solid, liquid, or supercritical phase.

Figure 10:
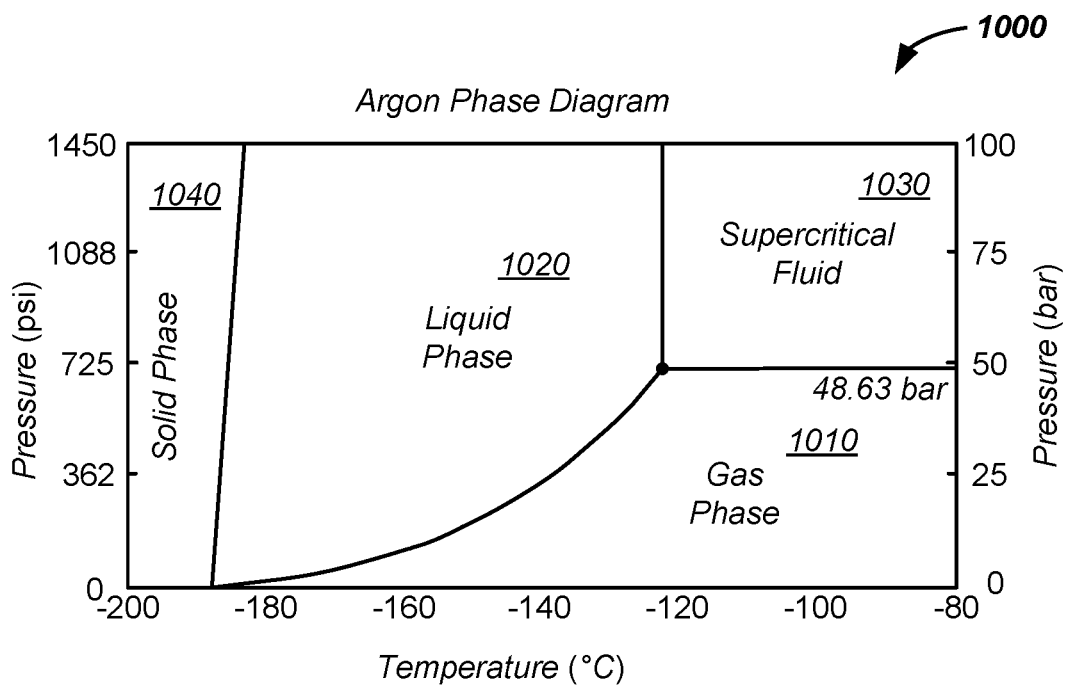
FIG. 10 illustrates an argon phase diagram.

Referring now to FIG. 10, an argon phase diagram 1000 is illustrated. As illustrated, argon is present in an argon gas phase 1010, an argon liquid phase 1020, an argon supercritical phase 1030, or an argon solid phase 1040 as a function of temperature and pressure.

Referring again to FIG. 9 and FIG. 10, nitrous oxide and argon are in different phases at some temperatures and pressures. However, nitrous oxide and argon are in the same phase at other temperatures and pressures, which facilitates manufacture of a two gas container, as further described infra.

Multi-Gas Pressurized Container

Figure 11:
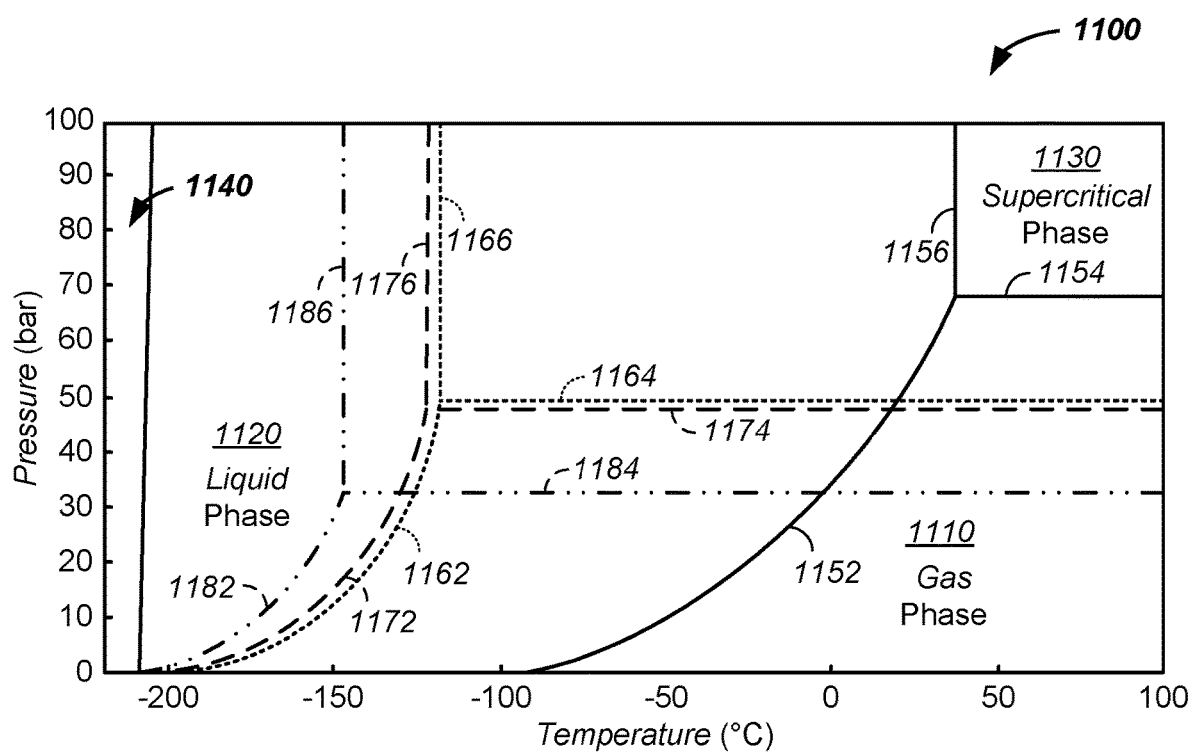
FIG. 11 illustrates multiple phase diagrams.

Referring now to FIG. 11, a multi-chemical phase diagram 1100 is provided. Herein, an apparatus comprising a container filled with two or more gases, a method of manufacture of the multi-gas containing container, and a method of use of the multi-gas containing container is described.

There exist many applications of mixed gas use. In a first example, in a dental office anesthesia of a patient is achieved by delivering nitrous oxide and oxygen. In a second example, in deep sea diving a mix of oxygen and a second gas such as helium and/or argon is used to prevent the bends. In a third example, tungsten inert gas (TIG) welding uses argon gas and hydrogen gas. In each of these cases, the gases are traditionally provided in separate containers and are mixed at time of use, such as through one or more regulators, which have inherent risks and expense. As described herein, delivery of the two or more gases in each of these examples is optionally and preferably from a single container containing the mixed gases. Herein, for clarity of presentation and without loss of generality, mixtures of nitrous oxide and a second gas, such as described supra in the preparation of a whipped topping, are used to describe a multi-gas pressurized container, a method of manufacture of a container pressurized with multiple gases, and a method of use of a container filled with multiple gases. Generally, the container, a method of manufacture of the container, and use of the container includes any number of gases in a single container, such as n gases, where n is a positive integer of greater than 1, 2, 3, 4, 5, 6, 7, 8, 9, or 10. Optional gases in the two or more gas mixture include any two of more of: nitrous oxide, ambient air, such as air in the earth's atmosphere, hydrogen, helium, nitrogen, oxygen, carbon dioxide, methane, neon, argon, krypton, or xenon. Generally, each atom or molecule is in a given phase at a given temperature and pressure, such as nitrous oxide is: (1) a gas at a first temperature-pressure combination, (2) a liquid at a second temperature-pressure combination, (3) a supercritical fluid at a third temperature-pressure combination, or (4) a solid at a fourth temperature-pressure combination. Hence, each atom, molecule, or gas is herein referred to as a chemical.

Referring again to FIG. 11, the multi-chemical phase diagram 1100 is further described. As illustrated, the multi-chemical phase diagram 1100 provides overlapped phase diagrams for nitrous oxide (solid line), molecular oxygen or $O_2$ (dotted line), argon (dashed line), and nitrogen gas or $N_2$ (alternating solid and double dotted line). Herein, the nitrous oxide, molecular oxygen, argon, and molecular nitrogen each exist in a gas phase 1110, a liquid phase 1120, a supercritical phase 1130, or a solid phase 1140.

Still referring to FIG. 11, nitrous oxide phases and phase changes are described as a function of temperature and pressure. Nitrous oxide changes from: a gas to a liquid at a nitrous oxide gas-to-liquid interface 1152, from a gas to a supercritical fluid at a nitrous oxide liquid-to-supercritical fluid interface 1154, and from a liquid to a supercritical fluid at a nitrous oxide liquid-to-supercritical fluid interface 1156. For example, at a pressure exceeding 72.45 bar and a temperature exceeding 36.4 degrees Celsius, nitrous is in a supercritical phase. Similarly, at temperatures greater than −100° C., nitrous oxide is in a liquid phase at temperatures and pressures above and/or to the left of the nitrous oxide gas-to-liquid interface 1152. Generally, the phase of nitrous oxide is determined using a combination of temperature and pressure.

Still referring to FIG. 11, molecular oxygen phases and phase changes are described as a function of temperature and pressure. Molecular oxygen changes from: a gas to a liquid at a molecular oxygen gas-to-liquid interface 1162, from a gas to a supercritical fluid at an molecular oxygen liquid-to-supercritical fluid interface 1164, and from a liquid to a supercritical fluid at a molecular oxygen liquid-to-supercritical fluid interface 1166. For example, at a pressure exceeding 50.4 bar and a temperature exceeding −118.57 degrees Celsius, molecular oxygen is in a supercritical phase. Similarly, molecular oxygen is in a liquid phase at pressures above the molecular oxygen gas-to-liquid interface 1162 and is in a supercritical phase at pressures above the molecular oxygen liquid-to-supercritical phase 1164.

Still referring to FIG. 11, argon phases and phase changes are described as a function of temperature and pressure. Argon changes from: a gas to a liquid at an argon gas-to-liquid interface 1172, from a gas to a supercritical fluid at an argon liquid-to-supercritical fluid interface 1174, and from a liquid to a supercritical fluid at an argon liquid-to-supercritical fluid interface 1176. For example, at a pressure exceeding 48.63 bar and a temperature exceeding −122.46 degrees Celsius, argon is in a supercritical phase. Similarly, at pressures above the argon gas-to-liquid phase change 1172, argon is in a liquid state. Again, the phase of argon is determined by controlling temperature and pressure.

Still referring to FIG. 11, molecular nitrogen phases and phase changes are described as a function of temperature and pressure. Molecular nitrogen changes from: a gas to a liquid at a molecular nitrogen gas-to-liquid interface 1182, from a gas to a supercritical fluid at an molecular nitrogen liquid-to-supercritical fluid interface 1184, and from a liquid to a supercritical fluid at a molecular nitrogen liquid-to-supercritical fluid interface 1186. For example, at a pressure exceeding 33.958 bar and a temperature exceeding −146.96 degrees Celsius, molecular nitrogen is in a supercritical phase. The phase of molecular nitrogen is determined by controlling temperature and pressure.

Still referring to FIG. 11, each of nitrous oxide, molecular oxygen, argon, and molecular nitrogen exist in a solid phase, such as at temperatures below −90.86, −218.79, −187.68, and −210.00 degrees Celsius, respectively.

Still referring to FIG. 11, there exists a range of temperatures and pressures where two or more chemicals are in a common phase and/or are two phases that mix. In a first case, a first chemical is in a gas phase and a second chemical is in a gas phase, which form a homogenous mixture. In a second case, a first chemical is in a liquid phase and a second chemical is in a liquid phase, which form a homogenous mixture. In a third case, a first chemical is in a liquid phase and a second chemical is in a supercritical phase, which form a homogenous mixture or a substantially homogenous mixture. In any of the first three cases, a container is filled with the homogenous mixture, where a portion of the mixture used to fill the container contains a mol ratio, mass ratio, and/or volume ratio of the prepared mix. After sealing the container, such as when the temperature of the sealed container is raised, the mix forms a gas mixture at the prepared mixture ratio. The sealed container is then used as a mixed gas container, such as in an anesthetic, a dive tank, for TIG welding, or as a pressure cartridge for preparation of a whipped topping, as described herein. The mix to be packaged is prepared by mixing known amounts of the two or more chemicals, such as by mass, percent, weight, and/or mol ratio where each of the two or more chemicals are present in any amount greater than 0.01, 0.05, 0.1, 1, 2, 5, 10, 25, 30, 40 percent of the mix and less than 99.99, 99.95, 99.9, 99, 95, 90, 75, 70, or 60 percent of the mix. More generally, any 2, 3, 4, 5 or more chemicals are mixed and packaged into the container at the stated percentages. For clarity of presentation and without loss of generality, examples are provided, infra, to further describe the process.

Example I

Still referring to FIG. 11, it is observed that nitrous oxide and molecular oxygen are both in a liquid phase or supercritical phase, which readily mix, in a first set of conditions, comprising temperatures and pressures that are: (1) greater than the melting point of nitrous oxide, −90.86° C.; (2) at pressures greater than the nitrous oxide gas-to-liquid phase change 1152 or the nitrous oxide gas-to-supercritical phase change 1154; and (3) above the molecular oxygen gas-to-supercritical phase phase change 1164. Said again, in a range of the first set of conditions, nitrous oxide and molecular oxygen mix as the liquid and/or supercritical phases of each of the first chemical, nitrous oxide, and the second chemical, molecular oxygen, mix. Thus, as the mixtures are dominantly homogeneous, in the first set of conditions, a container is readily packaged with mixtures of the nitrous oxide and the molecular oxygen at a ratio of the added components to the mixture.

Example II

Still referring to FIG. 11, it is observed that nitrous oxide and argon are both in a liquid phase or supercritical phase, which readily mix, in a second set of conditions, comprising temperatures and pressures that are: (1) greater than the melting point of nitrous oxide, −90.86° C.; (2) at pressures greater than the nitrous oxide gas-to-liquid phase change 1152 or the nitrous oxide gas-to-supercritical phase change 1154; and (3) above the molecular argon gas-to-supercritical phase phase change 1174. Said again, in a range of the second set of conditions, nitrous oxide and argon mix as the liquid and/or supercritical phases of each of the first chemical, nitrous oxide, and the second chemical, argon, mix. Thus, as the mixtures are dominantly homogeneous, in the second set of conditions, a container is readily packaged with mixtures of nitrous oxide and argon at a ratio of the added components to the mixture.

Example IV

Still referring to FIG. 11, it is observed that nitrous oxide, molecular oxygen, and argon are all in a liquid phase or supercritical phase, which readily mix, in a third set of conditions, comprising temperatures and pressures that are: (1) greater than the melting point of nitrous oxide, −90.86° C.; (2) at pressures greater than the nitrous oxide gas-to-liquid phase change 1152 or the nitrous oxide gas-to-supercritical phase change 1154; and (3) above the molecular oxygen gas-to-supercritical phase phase change 1164. Said again, in a range of the third set of conditions, nitrous oxide, molecular oxygen, and argon mix as the liquid and/or supercritical phases of each of the first chemical, nitrous oxide, and the second chemical, molecular oxygen, mix, and the third chemical, argon, mix. Thus, as the mixtures are dominantly homogeneous, in the third set of conditions, a container is readily packaged with mixtures of nitrous oxide, molecular oxygen, and argon at a ratio of the added components to the mixture. More generally, a temperature and/or a range of temperatures and a pressure and/or a range of pressures are selected where each of n chemical are in a phases that spontaneously mix, a mixture or desired proportions of the n chemicals is prepared and packaged/sealed in a container, and the temperature and pressure are transitioned to an operating temperature, such as where all of the chemicals are dispersed as a liquid, as a gas, and/or from a gas headspace, such as at a temperature within 2, 5, 10, or 20° C. of 25° C.

Example V

Still referring to FIG. 11, generally, any two or more chemicals are readily mixed if both chemical are in the same phase, such as both are in a gas phase or both are in a liquid phase, as controlled by temperature and pressure. Further, as liquid and supercritical fluids mix, any two or more chemicals are readily mixed if a first chemical is in a liquid phase and the second chemical is in a supercritical phase, as controlled by temperature and pressure of the mix.

Method of Manufacture

Generally, the two or more chemicals are sealed in a container, where the container includes an interface for dispersal of the mixed two or more chemicals. For example, a cartridge, such as the pressure cartridge 700, is formed by rolling sheet steel into a test tube shape; the test tube shape steel is heated and crimped to form a sealed bottom and a neck, which is ready to fill; an assembly bit surrounds the neck; the chemicals are inserted into the cartridge/container, such as through the assembly bit; and/or a capping mechanism seals a cap to the neck with the two or more chemicals inside the now sealed container, where the pressure and temperature of the inserted chemicals are at temperatures and pressures illustrated in FIG. 11. Optionally, the two or more chemicals are in a gas mixed gas phase at time of manufacture. The cap is sealed to the neck by one or more of the processes of galling, welding, cold welding, and crimping. Optionally, one or more of the chemicals is in a solid form. In this case, the solid form of each of the one or more chemicals is cut/weighed and the solid is dropped into the container, where one or more chemicals in a gas, liquid, and/or supercritical phase are added to the solid in the container prior to sealing.

Once sealed, the pressure container and/or contents therein, are brought from a manufacturing temperature and pressure to a shipping/use temperature and pressure, where a difference in the manufacturing temperature and use temperature is zero degrees or greater than 10, 20, 30, 40, 50, 60, 70, 80, 90, or 100° C. and a difference in the manufacturing pressure and a pressure at the time of delivery of the mixed chemicals from the container is zero bar or greater than 5, 10, 20, 30, 40, 50, or 60 bar, where an optional and preferred operating/use temperature and pressure is an atmospheric pressure ± less than 5, 10, 15, 20, 30, 40, 50, 100, 200, and 500 percent and within 1, 5, 10, 20 and 25° C. of 25° C.

For the terms "for example" and "such as" and grammatical equivalences thereof, the phrase "and without limitation" is understood to follow unless explicitly stated otherwise. As used herein, the term "about" is meant to account for variations due to experimental error. All measurements reported herein are understood to optionally be modified by the term "about", whether or not the term is explicitly used, unless explicitly stated otherwise. As used herein, the singular forms "a," "an," and "the" include plural referents unless the context clearly dictates otherwise.

The clause "Atmospheric pressure" as used herein refers to ambient pressure of about 1 atmosphere (atm), or about 1 bar at sea level.

The clause "Room temperature" as used herein is about 25° C.

All percentages (%) are by weight unless indicated otherwise in a specific circumstance.

Optionally, any element of the container, such as a body of the container is printed using three-dimensional metal printing technology, such as in an additive manufacturing process.

Herein, a set of fixed numbers, such as 1, 2, 3, 4, 5, 10, or 20 optionally means at least any number in the set of fixed number and/or less than any number in the set of fixed numbers.

In still yet another embodiment, the invention comprises any combination and/or permutation of any of the elements described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. While single PWM frequency, single voltage, single power modules, in differing orientations and configurations have been discussed, adaptations and multiple frequencies, voltages, and modules may be implemented in accordance with various aspects of the present invention. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
   a container, comprising:
      a pressure containment housing;
      a mixture, contained in said pressure containment housing, said mixture comprising:
         a first chemical; and
         a second chemical;
      an interface configured to control dispersal of said first chemical and said second chemical out of said container; and
      a pressure within said container at time of manufacture exceeding twenty bar.

2. The apparatus of claim 1, said pressure:
   exceeding a nitrous oxide gas phase-to-liquid phase interface pressure, said first chemical comprising nitrous oxide.

3. The apparatus of claim 2, said second chemical comprising:
 a liquid form of at least one of molecular hydrogen, helium, molecular nitrogen, carbon dioxide, neon, argon, krypton, and xenon.

4. The apparatus of claim 2, said pressure:
 exceeding a gas phase-to-supercritical phase pressure of said second chemical, said second chemical comprising at least one of: hydrogen, helium, nitrogen, carbon dioxide, neon, argon, krypton, and xenon.

5. The apparatus of claim 1, said first chemical comprising nitrous oxide in a nitrous oxide supercritical phase and said second chemical comprising at least one of hydrogen, helium, nitrogen, carbon dioxide, neon, argon, krypton, and xenon in a second chemical supercritical phase.

6. The apparatus of claim 1, said pressure containment housing comprising:
 a gas filled cylinder containing said mixture, said mixture comprising a gas mixture comprising at least ten percent, by mass, nitrous oxide gas and at least ten percent, by mass, of a second gas, where said first gas and said second gas comprise at least ninety-five percent, by mass, of all gases in said gas mixture.

7. The apparatus of claim 6, said interface further comprising:
 an outlet configured for coupling to at least one of:
  a tungsten inert gas welder;
  a scuba regulator;
  an anesthesia regulator; and
  a whipped topping container.

8. The apparatus of claim 6, said interface further comprising:
 an outlet configured for coupling to a receiving port of a user rechargeable whipped topping canister.

9. The apparatus of claim 1, said mixture comprising:
 nitrous oxide in a liquid phase.

10. The apparatus of claim 9, said mixture comprising:
 said second chemical in a supercritical phase, said second chemical comprising at least one of: molecular hydrogen, helium, molecular nitrogen, carbon dioxide, neon, argon, krypton, and xenon.

11. The apparatus of claim 1,
 said contained mixture comprising a solid form of nitrous oxide and a solid form of at least one of argon and nitrogen.

12. The apparatus of claim 1, said contained mixture comprising:
 at least ten percent by mass of a liquid form of nitrous oxide; and
 at least three percent by mass of a liquid form of at least one of: argon and molecular nitrogen.

13. The apparatus of claim 1, said interface comprising:
 an interface configured to charge a whipped topping container with said mixture, said mixture comprising at least twenty percent nitrous oxide by mass.

14. The apparatus of claim 13, said second chemical of said mixture comprising at least two percent, by mass, of at least one of: hydrogen, helium, nitrogen, carbon dioxide, neon, argon, krypton, and xenon.

15. The apparatus of claim 1, said mixture comprising:
 at least ten percent nitrous oxide by mass.

16. The apparatus of claim 1, said second chemical of said mixture comprising:
 at least two percent by mass of at least one of: molecular hydrogen, helium, molecular nitrogen, carbon dioxide, neon, argon, krypton, and xenon.

\* \* \* \* \*